(12) United States Patent
Petty

(10) Patent No.: US 10,674,082 B2
(45) Date of Patent: Jun. 2, 2020

(54) CAMERA STORAGE SYSTEMS AND METHODS

(71) Applicant: Blackmagic Design Pty Ltd, Melbourne (AU)

(72) Inventor: Grant Petty, Melbourne (AU)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 15/910,749

(22) Filed: Mar. 2, 2018

(65) Prior Publication Data

US 2018/0255244 A1 Sep. 6, 2018

Related U.S. Application Data

(60) Provisional application No. 62/466,310, filed on Mar. 2, 2017.

(51) Int. Cl.
| | |
|---|---|
| *H04N 5/232* | (2006.01) |
| *G06T 1/20* | (2006.01) |
| *G06T 1/00* | (2006.01) |
| *H04N 5/78* | (2006.01) |
| *H04N 9/79* | (2006.01) |
| *H04N 21/231* | (2011.01) |
| *H04N 5/28* | (2006.01) |
| *H04N 5/262* | (2006.01) |

(Continued)

(52) U.S. Cl.
CPC ....... *H04N 5/23245* (2013.01); *G06T 1/0007* (2013.01); *G06T 1/20* (2013.01); *H04N 5/262* (2013.01); *H04N 5/28* (2013.01); *H04N 5/77* (2013.01); *H04N 5/78* (2013.01); *H04N 9/7925* (2013.01); *H04N 21/2187* (2013.01); *H04N 21/231* (2013.01); *H04N 21/2343* (2013.01); *H04N 21/2747* (2013.01)

(58) Field of Classification Search
CPC ..... G06T 1/0007; G06T 1/20; H04N 21/2187; H04N 21/231; H04N 21/2343; H04N 21/2747; H04N 5/23245; H04N 5/262; H04N 5/28; H04N 5/77; H04N 5/78; H04N 9/7925

See application file for complete search history.

(56) References Cited

U.S. PATENT DOCUMENTS 9,565,419 B2  2/2017 Presler
9,973,785 B1 * 5/2018 Yang .................. H04N 21/2187
(Continued)

FOREIGN PATENT DOCUMENTS

WO  2008/128205 A1  10/2008

*Primary Examiner* — Amy R Hsu
(74) *Attorney, Agent, or Firm* — Seed Intellectual Property Law Group LLP

(57) ABSTRACT

A digital video camera includes a data processing pipeline being operable in a plurality of modes including a first mode in which said video output data is passed to a data storage system for storage on local non-volatile storage; a second mode in which said video output data is formatted into a native video data format of a video transmission system and passed to the video transmission system for transmission; and a third mode in which said video output data is processed into a video data format that is not a native video data format of the video transmission system and passed to the video transmission system for transmission to a secondary memory.

21 Claims, 4 Drawing Sheets

(51) Int. Cl.
    *H04N 5/77*           (2006.01)
    *H04N 21/2343*    (2011.01)
    *H04N 21/2187*    (2011.01)
    *H04N 21/2747*    (2011.01)

(56) References Cited

U.S. PATENT DOCUMENTS

| | | | | |
|---|---|---|---|---|
| 2006/0262199 | A1* | 11/2006 | Takahashi | H04N 5/232 |
| | | | | 348/231.2 |
| 2007/0229691 | A1* | 10/2007 | Oshima | H01L 27/14621 |
| | | | | 348/315 |
| 2010/0013945 | A1* | 1/2010 | Hada | G03B 17/40 |
| | | | | 348/222.1 |
| 2010/0064337 | A1 | 3/2010 | Dvir et al. | |
| 2011/0267500 | A1* | 11/2011 | Maki | H04N 5/2253 |
| | | | | 348/231.99 |
| 2013/0120663 | A1* | 5/2013 | Chang | H04N 5/23203 |
| | | | | 348/725 |
| 2014/0187239 | A1 | 7/2014 | Friend et al. | |
| 2015/0163534 | A1 | 6/2015 | Ko et al. | |

* cited by examiner

CAMERA STORAGE SYSTEMS AND METHODS

BACKGROUND

Technical Field

The present disclosure relates to digital video cameras, data storage systems for use with digital video cameras and their operation.

Description of the Related Art

Digital video cameras are, in some cases, provided with on-board data storage on which captured data, such as video, still images and audio captured by the camera, as well as supporting data such as metadata, can be stored. The storage capacity of a camera is typically limited by factors such as the physical size of the camera, the cost of storage media, and the weight of the camera. One way to increase the accessible storage capacity of a camera is to employ removable memory e.g., an off-the-shelf memory card or removable hard drive. While such removable media is easy to find and use, it still has a limited storage capacity and tends to be relatively expensive.

To maximize the amount of captured data that can be stored in on-board data storage the digital video camera will typically process the data so that it may be compressed. The captured data may also need to be encoded in a manner that allows it to be played back immediately (e.g., to check the quality, framing etc. of the captured video) at the camera either via an on-board display or on a connected monitor. This means that the camera needs significant data processing capabilities to perform these functions as well as being able to control the operation of the data storage medium.

Professional cameras, such as those mainly used for broadcasting and video production, generally do not store any captured data internally. Instead, the captured data is transmitted to a remote data processing system via a video transmission interface. One common type of video transmission interface is the Serial Digital Interface (SDI) family of video interfaces. In this case the captured data is typically transmitted as an uncompressed video stream formatted according to the video transmission protocol applicable to the video transmission interface. The remote data processing system then processes the received data and may store it on a remote recording device for later use, make it available for immediate broadcast, or the like. These remote data processing systems present both advantages and disadvantages. Firstly they must be capable of processing this highly specialized data, including performing video compression and encoding. Since the video transmission interface sends largely unprocessed video data, it must also convert the data to a format that is compatible with its data storage file system, and control the physical operation of its data storage system. The video transmission protocol may only be compatible with the transfer of video data in specific resolutions and frame rates, which may be of lower quality than the captured data, thus the quality of the stored video is constrained. Moreover they require separate operation from the camera. However, their storage capacity can be much larger than on-board data storage systems described above. This advantageously allows effectively uninterrupted recording operation of the camera without practical memory constraints.

Some digital video cameras have both on-board data storage and a video transmission interface to send captured data to an external data processing system. Such a camera must have the capabilities to perform all functions discussed above. In use, the camera operator selects whether captured data will be stored in the on-board data storage system or transmitted and the camera performs the required data processing and delivers the data to the chosen "destination". In some cameras both modes of operation may be used simultaneously.

The present inventors have determined that there is a need for an alternative recording solution for a camera that addresses one of the drawbacks of the aforementioned systems.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY

In broad concept, the present disclosure includes methods and systems, as well as components thereof, which utilize a digital video camera's video transmission interface to transmit video data to a data storage device that is operated under the control of the camera. Because the camera controls the data storage device, it is possible to depart from the native video transmission protocol used by the video transmission interface. In particular, the ordinary limitations on resolution and/or frame rate which apply to a video stream transferred over the camera's video transmission interface can be avoided. The data storage device is preferably be mounted to the camera and/or powered by a power source associated with the camera.

In a first aspect there is provided a digital video camera including an image capture system configured to convert received light into video data; a data processing pipeline configured to process at least said video data to generate video output data; a video transmission system operable to transmit processed video output data in at least one native video transmission format; a data storage system configured to receive video output data and store it in local non-volatile storage, said data processing pipeline being operable in a plurality of modes including a first mode in which said video output data is passed to the data storage system for storage on local non-volatile storage; a second mode in which said video output data is formatted into a native video data format of the video transmission system and passed to the video transmission system for transmission; and a third mode in which said video output data is processed into a video data format that is not a native video data format of the video transmission system and passed to the video transmission system for transmission to a secondary memory.

In a further aspect there is provided a digital video camera including an image capture system configured to convert received light into video data; a data processing pipeline configured to process at least said video data to generate video output data; a video transmission system operable to transmit video output data in one or more native video data formats compatible with a native video transmission format of the video transmission system; a data storage system configured to receive video output data and store it in local non-volatile storage, said data processing pipeline being operable in a plurality of modes including a first mode in which said video output data is passed to the data storage system for storage on local non-volatile storage; a second mode in which said video output data is formatted into a native video data format of the video transmission system and passed to the video transmission system for transmission; and a third mode in which said video output data is passed to the video transmission system for transmission to a secondary memory, wherein when said third mode is used, said video transmission system is configured to transmit the video output data in a format-agnostic manner.

In one form, transmitting video output data in a format-agnostic manner includes transmitting the video output data without using either or both of the native video data formats or native video transmission format of the video transmission system.

In some forms the video transmission system may only apply data encoding of the video output data prior to transmission. In the above aspects, preferably the data processing pipeline can operate in the first mode simultaneously with either of the second or third modes.

Preferably the data processing pipeline, when operating in the third mode cannot operate in the second mode. In a preferred form, the camera can determine the availability of a second memory and enable operation of the data processing pipeline in the third mode.

Preferably the secondary memory device is an external memory device, for example a hard disk, solid state drive or the like, that is controlled by the digital video camera.

The data processing pipeline in embodiments of either of the above aspects can preferably include an image processing subsystem, a video encoding subsystem, and a format conversion subsystem.

In the first mode, the video data is preferably processed by the image processing system and video encoding system prior to being passed to the data storage system.

In the second mode, the video data is preferably processed by the image processing system and the format conversion system prior to being passed to the video transmission system.

In the third mode, video data is preferably processed by the image processing system and video encoding system prior to being passed to the video transmission system. In this mode, the format conversion subsystem is preferably not used to convert the format of the video output data.

The video encoding subsystem can be configured to encode video data in any video format including, but not limited to Lossless CinemaDNG RAW format, Apple ProRes 422 HQ format, ProRes 422 format.

The image processing subsystem can perform any one or more of the following functions: correction of unwanted optical effects, demosaicing, gamma correction, noise reduction, correction of pixel-to-pixel variations in captured video data, color space conversion, or the like.

The data processing pipeline described herein can be formed from hardware or software, or a combination of the two. For example, the video encoding subsystem could be a data processing system including one or more data processors, and associated working memory, programmed to implement the functionality of the subsystem, e.g., a video codec. In other embodiments, it could include an ASIC or programmed FPGA adapted to process video data (and optionally metadata and audio data). Although nominally described as being separate the subsystems making up the data processing pipeline may share hardware and/or software components.

The video transmission system can preferably include an interface having at least a video output port. Preferably the video interface includes a video output port and a video input port. The video interface may operate according to the SDI Video protocol or other video transmission protocol.

In a preferred form, the camera can include a memory control subsystem configured to control storage of video data on the secondary memory when the video output data is sent to the video transmission system. The memory control subsystem is preferably arranged to transmit and/or receive control signals to and/or from the secondary memory via the video transmission system to control storage and retrieval of video data on the secondary memory.

The memory control subsystem can further perform error detection and or correction processing of the video output data and/or control signals transmitted to the secondary memory. In one form, the error detection and or correction processing can include calculating an error correcting code to be transmitted with the video output data or control signal.

In some embodiments, the camera can determine the connection of an external device to the video transmission system. In some embodiments, this can include determining the availability of a second memory and enable operation of the data processing pipeline in the third mode.

In a preferred form, the camera includes a user interface enabling the user to select a mode of operation of the data processing pipeline. The interface preferably enables a user to select a storage destination for video data that corresponds to a selection of either or both of the first and third modes of operation.

The camera can include a power supply system for providing power for its operation. The power supply system preferably includes at least one battery or other power storage system or a port for receiving a power cable to receive power from an external power supply. The camera and/or power supply system can include a power output for powering an accessory, for example the secondary memory.

The camera device can include mounting structure configured to cooperate with an accessory, e.g., a battery or secondary memory to mechanically couple the accessory to the camera. The video interface can, in some embodiments, form part of the mechanical coupling.

In a second aspect, there is provided a camera comprising an image capture system for capturing images and outputting video data representing the captured images, a video transmission system allowing coupling to one or more external devices and configured to transmit video data using a native video transmission format, said native video transmission format being compatible with the transmission of video data having one or more predetermined video frame rates and/or resolutions, and a data processing pipeline for processing video data into a second video data format that may not have a video frame rate and/or resolution that is compatible with the native video transmission format and to forward the second video data to the video transmission system of the camera for storage on an external mass storage device coupled to the video transmission system.

Preferably the native video data format may be one that natively transmits uncompressed video data. Preferably the data processing pipeline is configured to generate the second video data for transmission via the native video transmission format of the video transmission system without transcoding the second video data into video data having either of a video frame rates or resolution that is compatible with the native video data format. Most preferably, the data representing the second video data is formatted into a data stream transmittable according to the physical encoding of the native video transmission format. As will be appreciated, in this case the underlying data transmitted on the video transmission system interface may not be video data compatible with the native video transmission format.

The data processing pipeline is preferably also configured to process control data for transmission via the video transmission system to the external mass storage device, said control data being configured to control storage of the video data on the external mass storage device.

The data processing pipeline can be configured to enable perform error detection and or correction processing of the video output data and/or control signals transmitted to the secondary memory. In one form, the error detection and or correction processing can include calculating an error correcting code to be transmitted with the video output data or control signal.

In one form, the video transmission system includes at least a video output port. In one form, the video transmission system includes a video output port and a video input port. The video interface may operate according to the SDI Video protocol.

In a preferred form, the camera can include a memory control subsystem configured to control storage of video data on the external memory when the video output data is sent to the video transmission system. The memory control subsystem is preferably arranged to transmit control signals to the secondary memory via the video transmission system to control storage and retrieval of video data on the secondary memory. The memory control subsystem can include a host bus adaptor to convert the second video data into a signal according to the data storage protocol for transmission to the external data storage system.

In a third aspect, there is provided a method of operating a video camera, including an image capture system configured to convert received light into video data; a data processing pipeline configured to process at least said video data to generate video output data; a video transmission system operable to transmit processed video data in at least one native video transmission format; a data storage system configured to receive video output data and store it in local non-volatile storage; said data processing pipeline being operable in one or more of a first mode in which said video output data is passed to the data storage system for storage on local non-volatile storage; a second mode in which said video output data is formatted into a native video data format of the video transmission system and passed to the video transmission system for transmission; and a third mode in which said video output data is processed into a video data format that is not a native video data format of the video transmission system and passed to the video transmission system for transmission to a secondary memory; the method including enabling the third mode of operation in the event that a secondary memory is connected to the video transmission system.

Preferably the native video transmission format is compatible with the transmission of video in a video data format data having one or more predetermined video frame rates and/or resolutions. In this case, in the third mode of operation the data processing pipeline processes the video data into a second video data format that may not have a video frame rate and/or resolution that is compatible with the native video transmission format.

The method can further include enabling the second mode of operation in the event that a secondary memory is not connected to the video transmission system.

The method can include receiving a user input to select a mode of operation of the data processing pipeline. The input can comprise receiving a selection of a data storage destination for captured video that correspond to a selection of the first and third modes of operation.

In the first and or third modes of operation the data processing pipeline can process video data into a storage format that can be saved onto a data storage medium. The data storage format can be directly writable to a data storage medium.

In some embodiments, the first and/or third modes of operation include encoding and or compressing video data. In any of the above-mentioned embodiments, when the data processing pipeline is operating in the third mode and a secondary memory is connected to the video transmission system, the method can include formatting the video output data into form that is transmissible within the native video transmission format of the video transmission system, and transmitting the video data to the secondary memory.

Formatting the video output data into form that is transmissible within the native video transmission format of the video transmission system preferably includes applying data encoding of the video output data according to the native video transmission format of the video transmission system. Control data and other link control data can also be transmitted. Preferably only data encoding of a data stream including the video output data is performed by the video transmission system.

Preferably this does not include transcoding the video data.

The method can further include performing error detection and/or correction processing of the video output data and/or control data transmitted to the secondary memory. In one form, the error detection and or correction processing can include calculating an error correcting code to be transmitted with the video output data or control data.

The method can further include receiving the video output data in the native video transmission format of the video transmission system, and processing the received data formatted according to the video transmission protocol and converts it for writing to the data storage system.

Preferably processing the video output data from the native video transmission format of the video transmission system does not include transcoding the video output data.

The method can further include transmitting and/or receiving storage system control signals between the secondary storage system and the camera via the video transmission system.

The method can further include checking a received error detection and or correction data received with the control signals and or video output data. In the event an error is detected, taking an action. The action can include discarding the corresponding received data, performing error correction, requesting retransmission of the data detected to have the error.

In a further aspect, there is provided a method of operating a video camera, including an image capture system configured to convert received light into video data; a data processing pipeline configured to process at least said video data to generate video output data; a video transmission system operable to transmit processed video data in at least one native video transmission format; a data storage system configured to receive video output data and store it in local non-volatile storage; said data processing pipeline being operable in one or more of a first mode in which said video output data is passed to the data storage system for storage on local non-volatile storage; a second mode in which said video output data is formatted into a native video data format of the video transmission system and passed to the video transmission system for transmission; and a third mode in which said video output data is processed into a video data format and passed to the video transmission system for transmission to a secondary memory; the method including transmitting the video output data on the video transmission system in a format-agnostic manner.

In one form, transmitting video output data in a format-agnostic manner includes transmitting the video output data without using either or both of the native video data formats or native video transmission format of the video transmission system.

In some forms, the video transmission system may only apply data encoding of the video output data prior to transmission.

In some forms, error detection and or correction processing of the video output data and/or control signals is performed. This can include calculating an error correcting code to be transmitted with the video output data or control signal.

In a further aspect, there is provided a mass storage device for use with a video camera, said device including a video data transfer interface configured to be coupled to a video input source to receive data transmitted according to at least one native video transmission protocol; a data storage system configured to store data according to a data storage format; and a data conversion system configured to convert data received on the video data transfer interface according to the video transmission protocol and convert it for writing to the data storage system.

In one form, the data conversion system receives a signal representing video data to be written to the data storage system physically encoded according to a native video transmission protocol of the interface, but which is not formatted according to either or both of the native video data formats or native video transmission format of the video data transfer interface.

The data conversion system can perform data decoding conversion of the received data to generate video data to be written to the data storage system. The converted data may be directly available in a data storage format or converted thereto by removal of additional flow control data.

The data conversion system can also receive storage system control signals within the received data, and outputs control signals to the data storage system.

Preferably the video data transfer interface is further configured to transmit data formatted according to at least one native video transmission protocol. The data conversion system can be configured to convert data read from the data storage system and format it into the video transmission protocol for transmission via the video data transfer interface.

The data conversion system can also transmit storage system control signals within the transmitted data.

Preferably, the data transfer interface includes a video input port and/or a video output port. Said port or ports can preferably be configured to receive or transmit video data according to at least one native video transmission protocol. Preferably, this is a serial video transmission protocol.

In some embodiments, the data conversion system can include a host bus adaptor to convert received data into a signal according to a data storage format for transmission to a data storage medium of the data storage system. The data conversion system can include a buffering system, wherein data received via the data transfer interface is buffered before passing to the data storage medium. In this case, the storage system control signals can influence the speed of data arrival at the video interface to control the amount of buffered data.

The mass storage device can include a power supply system for providing power for its operation. The power supply system can include at least one battery or other power storage system or a port for receiving a power cable to receive power from an external power supply.

The mass storage device can include mounting structure configured to cooperate with the video camera to mechanically couple the mass storage device to the camera when in use. The video interface can, in some embodiments, form part of the mechanical coupling.

The mass storage device can include further mounting structure(s) configured to cooperate with other components of a video camera system to mechanically couple the other components to the mass storage device when in use. In a preferred form, the other component is a battery that can be piggybacked on the mass storage device by a further mounting structure. In this embodiment, the mass storage system can further provide power from the battery to the camera.

One or more additional mounting structures may also be provided to enable the mounting of other components or accessories (e.g., a battery) to the mass storage device. In this way a battery, accessory (including another mass storage device) can be "piggybacked" on the mass storage device.

In a further aspect, there is provided a method of configuring a video camera of the type including an image capture system and a video interface configured to transmit data according to a native transmission protocol; the method including receiving one or more software update data files; updating the software stored in a memory of the camera, and configured to control operation of the camera, using the one or more software update data files so that the software stored in a memory of the camera that is configured to control operation of the camera, when executed, enables the camera to operate in accordance with a method described herein. This aspect of the concept of a software update should be understood to mean any mechanism for changing or updating the operating instructions of a video camera including a firmware upgrade or the like.

As used herein, except where the context requires otherwise, the term "comprise" and variations of the term, such as "comprising", "comprises" and "comprised", are not intended to exclude further additives, components, integers or steps.

Further aspects of the present disclosure and further embodiments of the aspects described in the preceding paragraphs will become apparent from the following description, given by way of example and with reference to the accompanying drawings.

DETAILED DESCRIPTION

Figure 1:
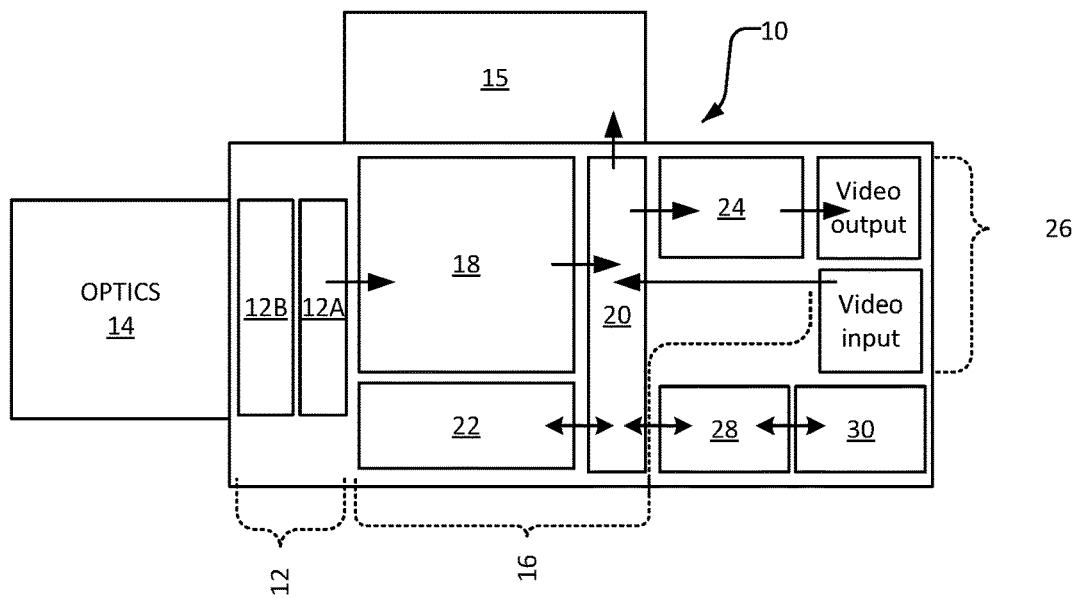
FIG. 1 is a schematic block diagram illustrating a digital video camera.

Illustrative embodiments of the present disclosure will now be described by way of non-limiting example only with reference to the figures. FIG. 1 is a schematic block diagram illustrating a digital video camera. An example of such cameras are members of the URSA range of cameras produced by Blackmagic Design or similar cameras.

The camera 10 includes an image capture system 12 configured to convert received light into video data. In this example, the image capture system 12 includes an image sensor (e.g., a CCD or CMOS image sensing chip or similar) and associated optical filter 12B (e.g., an IR cut-off filter or an optical low pass filter). An optical system 14, e.g., lens, is also provided to form images on the image sensor. The video data that is generated by the image capture system 12 will typically be raw sensor data, which is passed into the data processing pipeline 16 for further processing. Initially the raw video data is passed to the image processing subsystem 18. The image processing subsystem 18 may comprise one or more data processors, such as an ASIC or FPGA or microprocessor, and is configured to perform a range of image processing tasks. These tasks can include but are not limited to: correction of unwanted optical effects such as pincushion distortion or others, demosaicing the Bayer mosaic image, gamma correction, noise reduction, correction of pixel-to-pixel variations in captured video data, e.g., by removing dead pixels and correcting for conversion efficiency variations and color space conversion. Working memory 20 is provided to enable temporary storage of data during image processing and or image compression and other tasks.

The data processing pipeline also includes a video encoding system 22. The video encoding system 22 will typically be implemented by providing software configured to enable a processor to implement one or more video codecs. This system can be used to encode and optionally compress the video data into a desired format. For example, the video encoding subsystem 22 can be configured to encode video data into any known video data format including CinemaDNG RAW format, Apple ProRes 422 HQ format, and ProRes 422 format, to name a few.

The data processing pipeline 16 also includes a format conversion system 24 which processes video output data into a format that is able to be transmitted over the video transmission system 26. As will be described below in more detail, the video transmission system 26 is generally configured to only transmit video data which complies with one or possibly several native video transmission protocols. These native video transmission protocols will mandate, inter alia, the frame rate and/or image resolution of video data that can be transmitted over the video transmission system. The format conversion system 24 is provided to format the video data into one of said native video transmission formats to enable transmission, before being passed to the video transmission system 26. This can include transcoding video data from its original format into (one of) the native video transmission formats of the video transmission system 26.

The video transmission system is operable to transmit (and optionally receive) video output data via a video interface having at least a video output port. The video interface can be bi-directional and thus also include a video input port. As an example the video interface could be an SDI interface or other like interface. As noted above, SDI interfaces can operate at various bitrates to carry a video in a range of native video transmission formats—e.g., 3D-SDI can carry high definition video at 1080p resolution at up to 60 frames per second. Moreover native video transmission format may also specify the color encoding and bitstream format for the transfer of video data.

The camera also includes a data storage system in the form of a memory control subsystem 28 which is configured to control persistent storage of video data (and any other data) on a local non-volatile memory 30. As noted above, the local memory 30 may use a removable memory such as a memory card or removable hard drive. In this case, the memory control subsystem will include a memory interface (e.g., socket) for making mechanical and electrical connection with the removable memory while in use. However, in the general case, the memory control subsystem 28 is arranged to transmit and/or receive control signals to/from the local memory 30 to control storage and retrieval of video data on the memory 30 and also to perform any encoding or formatting of data for storage. For example, the memory control subsystem can include a host bus adaptor to convert the video data (and any other data to be stored) into a signal according to the data storage protocol writing to the memory 30. For example, the memory 30 could be a solid state drive operating according to the Serial ATA protocol, in which case the memory control subsystem will operate to control operation of the SATA drive and manage reading and writing of data to it.

In general terms, the camera of FIG. 1 can operate with its data processing pipeline 16 in two modes (perhaps simultaneously). In a first mode, data is processed for storage on the storage medium 30. In this case the video data output from the image capture system 12 is processed by the image processing system 18 and video encoding system 12 prior to being passed to the data storage system 28 for writing to memory. The format conversion system 24 is not needed, because there is no restriction on the format of video data that is able to be stored on the memory 30. For example raw sensor data without any image processing could theoretically be stored in the memory 30, in which case the image processing system 18 or encoding system 25 are transparent to the video data. In one alternative, a highly corrected and compressed form of video data could be stored. Between these two examples many other levels of encoding and compression exist, as will be known to those skilled it the art. Moreover, as noted above, only a very small subset of these possibilities generates video data which is in a video data format that is compatible with (native to) the video transmission system 26.

In the second mode, the data processing pipeline 16 sends data to the video transmission system 26. After image processing, the video output data is formatted into a native video data format of the video transmission system by the format conversion system 24 and passed to the video transmission system for transmission on the video interface.

In some cases, both operation modes may operate simultaneously. For example on a camera capable of capturing 4 K video, a datastream for broadcast as 1080p high definition television could be passed out of the video transmission interface by processing in the second data processing mode. A file storing the full 4 K resolution video could also be saved by using the second mode of operation on the local memory 30.

The present inventor has realized that as the camera of FIG. 1 has already the capability to, inter alia, encode and compress the video data into a wide variety of formats, and store it to media in the camera itself it only requires a mechanism to attach larger external storage media to the camera to significantly extend the storage capabilities of the camera. The inventor has further realized that the camera's video transmission interface could be used to connect to the larger external storage. Furthermore, by operating the data processing pipeline of the camera in a third mode, little (if any) additional hardware is needed to implement the system.

Accordingly, in an embodiment of the present disclosure, the data processing pipeline can operate in a third mode. In the third mode, video output data is processed and passed to the video transmission system for transmission to a secondary memory, e.g., an external memory. However, the video data to be stored on the secondary memory is not required to be in a native video data format of the video transmission system. In this third mode, the video data is processed by the image processing system 18 and video encoding system 22 prior to being passed to the video transmission system. The format conversion subsystem 24 not used to convert the format of the video output data.

This can be facilitated by effectively controlling the secondary memory with the camera 10. This enables the camera and memory to effectively bypass the high level formatting requirements of the video transmission system and utilize only its lower layer protocols only. The level of memory control exercised by the camera over the secondary memory can vary between implementations as will become apparent in the further description.

Figure 2:
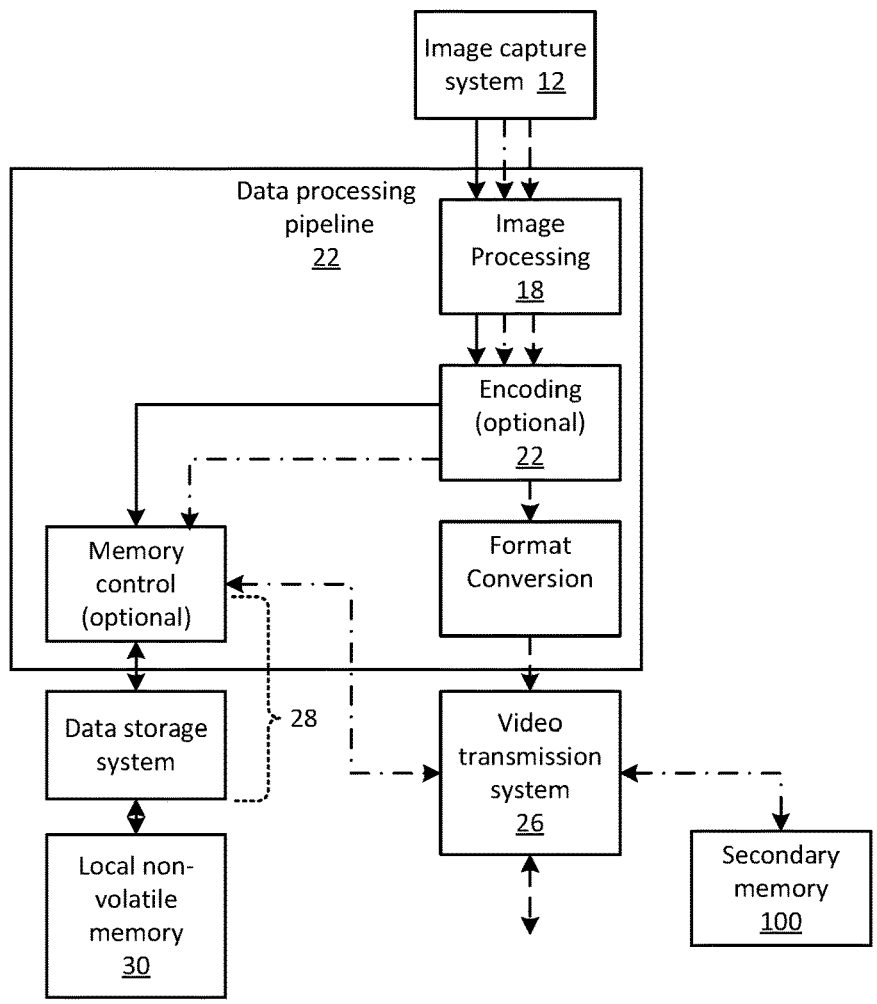
FIG. 2 is a schematic functional block diagram illustrating how data may be processed in at least one embodiment of the present disclosure.

FIG. 2 illustrates schematically the three modes of operation of the data processing pipeline in an embodiment of the present disclosure. The solid line indicates the first mode of operation, the dashed line represents the second mode of operation of the data processing pipeline, and the dot-dashed line represents the third mode of operation of the data processing pipeline.

Figure 3:
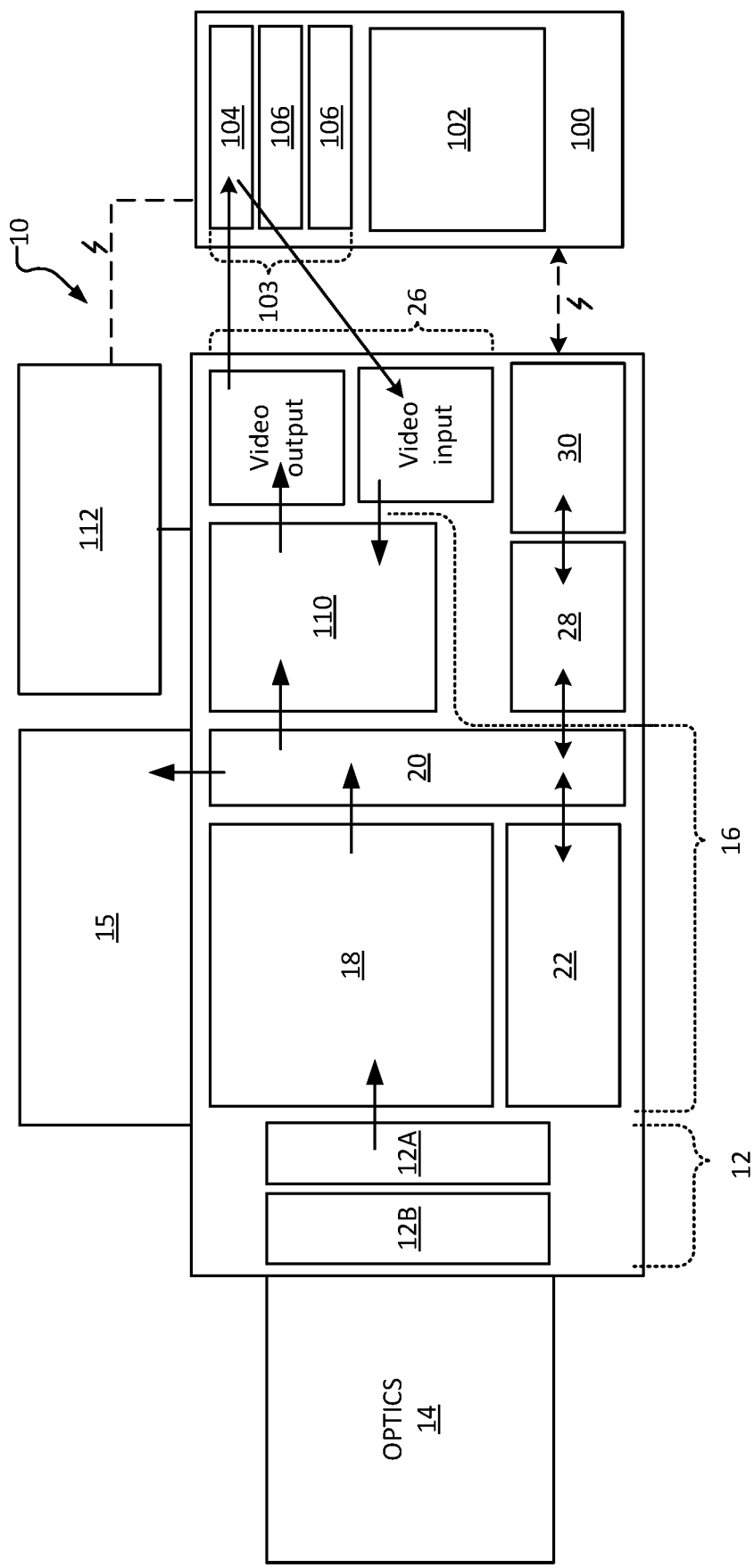
FIG. 3 is a schematic block diagram of a digital video camera and remote storage device able to implement an embodiment of the present disclosure.

FIG. 3 illustrates the camera 10 of FIG. 1 and a mass storage device 100 configured to operate as a secondary memory device as discussed above. The camera may be substantially identical to that of the previous embodiments, but requires additional functionality to use the mass storage device 100, namely software and/or hardware components capable of controlling the use of the mass storage device 100. In existing cameras, such a software module can be provided by way of a software update to enable use of a mass storage device 100.

The mass storage device 100 includes a video data transfer interface 26A configured to be coupled to a video input source, which in this case is the video transmission system 26 of the camera 10. The mass storage device 100 also includes a data storage system 102. The data storage system 102 can include any type of large scale data storage system including one or more hard drives, flash drives, removable solid state drive, or an array of drives. The data storage system will typically be configured to store data according to a data storage format, e.g., a SATA hard drive. Finally, the mass storage device includes a (lower layer) data conversion system 103 configured to convert received data for writing to the data storage system. More particularly, the video data interface is physically adapted to receive signals encoded according to a native video transmission protocol. In this example, the interface is physically and electrically compatible with the SDI standard, which is selected because this matches the transmission system 26 of the camera 10.

The data conversion system 103 includes, in this example, a physical layer 104 for receiving and processing signals electrically compatible with the video transmission system. The camera 10 includes a matching physical layer within the video transmission 26 system to enable physical communication between the camera 10 and the mass storage device 100. In a preferred embodiment of the present disclosure, when storing data on the external mass storage device 10, the data transmission system is confined to perform data encoding functions using a data stream provided by the data processing pipeline. In this mode of operation, the data transmission system effectively becomes format-agnostic in the sense that it does not require the data it is transmitting to be formatted into a compatible data transmission format or assembled or framed according to its native data transmission protocol.

The data conversion system 103 also includes a storage link layer 106 which cooperates with a counterpart storage transport component 110 of the camera 10. The storage transport controller can be provided as a dedicated system within the camera, but more typically will be a software module. It may run as either part of the video transmission system or storage control system or as a standalone module. The storage link layer 106 controls the logical connection between the camera and storage PHY component 108 and deals with data flow control, buffering, transmission rates etc. Advantageously, the camera is already adapted to generate data suitable for storage on its internal memory 30. Video data formatted in this manner (which as noted above is not restricted to the native video data format of the video transmission system 26) can thus be assembled along with link management overhead data, by the storage transport component 110 of the camera and transmitted using the data encoding (including things such as data scrambling to prevent longs runs of zeros, etc.) of the native video transmission protocol of the video transmission interface 26, but preferably with no higher layer format limitation imposed by the video transmission protocol. The storage transport component 110 can also implement appropriate error detection or correction processing.

As will be appreciated, a video transmission on the SDI interface does not necessarily need transmission error handling, protection or even correction mechanisms as the transmitted data is generally used as a live stream that does not allow retransmitting video frames. Furthermore, an error does not tend to lead to any major issue when a single pixel of a transmitted video image is being corrupted. However, this is not the case in embodiments of the present disclosure. When transmitting storage data over such a video transmission system additional error protection is preferably implemented to ensure that any potential bit error cannot lead to corruption of the file system of the mass storage device 100 when transferring data to/from the mass storage device, or of the camera memory when reading data from the mass storage device 100. For example the system can include a parity check and or CRC to guard against link errors. CRC checks are preferably used to ensure correct reception of control data between the camera and mass storage device or vice versa The Video PHY 104 simply ignores the content of the received data and passes it to the storage link component 106 to interpret according to its protocol.

The actual video data to be written to the extended storage medium 102 is passed to the storage physical layer 108 which controls the low level operations of the extended storage media 102 of the mass storage device 100.

The data transfer process can be viewed as storage PHY component 106 of the data conversion system 103 receiving a signal representing video data to be written to the data storage system, that had been received by the video PHY 104 and which was encoded in scheme that is compatible with the particular video transmission protocol, but which did not necessarily have any higher layer formatting of the native video data transmission protocol or associated video data formatting protocol.

As noted above the data conversion system 103 can also receive storage system control signals within the received data, and output control signals to the data storage system. Although the data conversion system 103 can include a buffering system, wherein data is buffered before the storage media 102 becomes ready to receive data again, in one form these control signals enable a data flow control mechanism between camera 10 and mass storage device 100 to avoid the need for excessive data buffering in the mass storage device 100. The mass storage device can be further configured to perform error protection processing, e.g., error detection and or correction processing, by receiving any encoded error detection or correction data transmitted. In the event an error is detected taking an action. The action can include discarding the corresponding received data, performing error correction, and requesting retransmission of the data detected to have the error.

Figure 5:
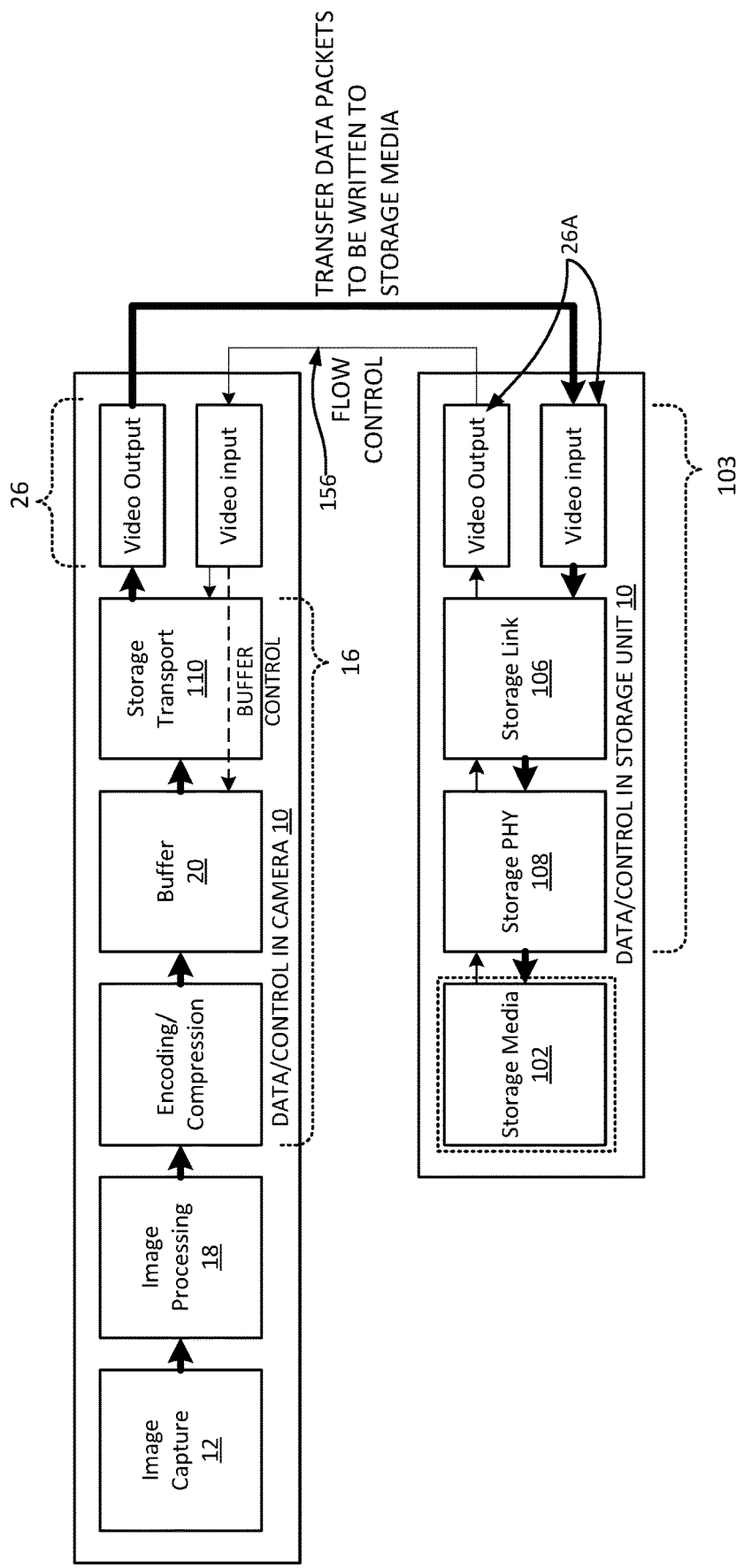
FIG. 5 illustrates a method of implementing an embodiment of the present disclosure.

FIG. 5 illustrates flow of data and control signals between the camera 10 and mass storage device 100, and illustrate how, flow control on write transfers can be implemented. In a preferred form, this is achieved by sending special characters on the return link 150 (from the mass storage device 100 to the camera video input) to signal to the storage transport component 110 the status of the extended storage media, e.g., as ready, or to hold. If the storage device requests to hold during a write transfer, the mass storage device 100 passes the hold condition back to the camera 10 so that there is only minimal buffering required in the storage unit and buffering takes place primarily on the camera 10 in buffer 20.

In the case the system is arranged to enable data from the storage media 100 to be transferred back to the camera 10 over the video transmission interface 26, e.g., to enable high speed video input for streaming video on the camera display 10 read transfers can use a similar mechanism.

Figure 4:
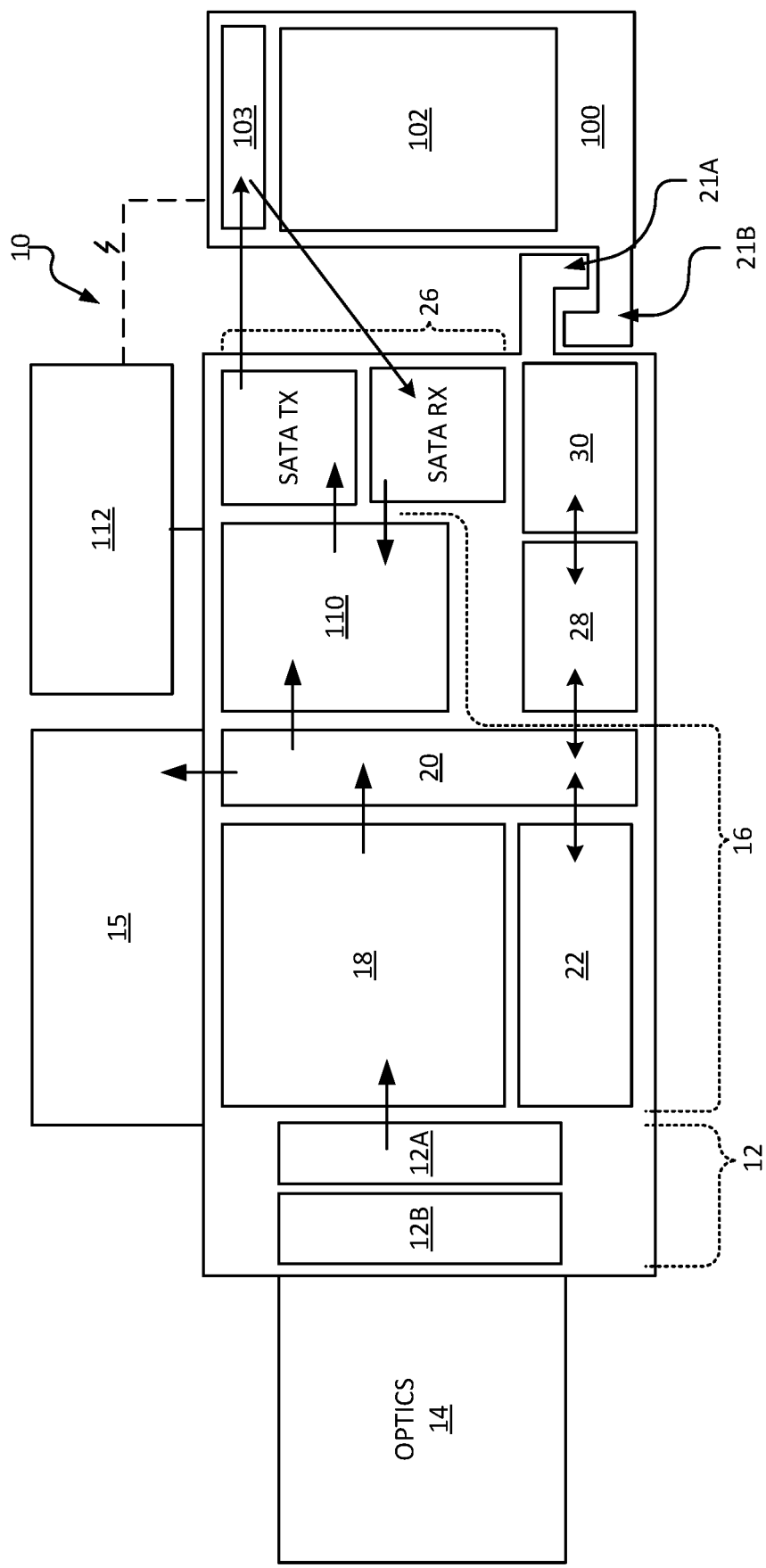
FIG. 4 is a schematic block diagram of a digital video camera and remote storage device able to implement another embodiment of the present disclosure.

FIG. 4 illustrates a further embodiment of the camera 10 and mass storage device 100 according to embodiments of the present disclosure. This version differs from that of FIG. 3 in that additional control over the storage device 100 has been passed to the camera 10. This version differs to the previous embodiment in that the link control and storage control (previously performed by the storage link 106 and PHY components 106 of the storage device 100) are performed in the camera, by an expanded storage transport module 110. In this case, the data conversion system 103 of the mass storage device 100 essentially becomes a PHY layer only. In this case, the expanded storage transport module 110 outputs data packets that are directly compatible with the storage media's 102 operating protocol (e.g., SATA). These are transmitted in the place of (at least) the video payload in the native video transmission protocol of the video transmission interface 26 to the mass storage device 100. The data conversion system 103 of the mass storage device extracts these data packets and passes them on the memory PHY layer directly to the extended storage media 100. An appropriate error protection scheme (e.g., detection and/or correction scheme) can be implemented on transmissions using the embodiment of the present disclosure. The error detection or correction can include transmitting an error correction code with data packets.

As noted above, there are generally two types of transactions between the camera and the mass storage device: command type transactions of control data to configure or request transfers; and data type transactions that are the bulk transfers resulting from the requests.

The form of error correction on the different types of data transactions can be the same or different. For example the system can include a parity check as well as a CRC.

The content of the command type transactions may be protected by a more robust scheme, such as a CRC which is appended to the end of the command packet. Commands received with incorrect CRCs are ignored, thus preventing data requests to invalid or incorrect addresses. For example a checksum can be used such as CRC32 or the like. A less robust check, such as a parity check can provide a lightweight protection of the data type transactions between camera and storage system (or vice versa). If a parity error is detected the rest of the data packet is ignored and the data discarded. A reset of the storage transport controller can then follow to ensure a clean start of the next transaction.

Returning to the overall operation of the camera 10, determination as to which mode of operation the data processing pipeline should operate in can be either automatic or manual. In some embodiments this can include determining the availability of a secondary memory, e.g., by receiving a predetermined signal from the external memory signal, and if a secondary memory is connected to the video transmission system automatically activating the third mode of operation. The camera can also provide a user interface enabling the user to select the mode of operation of the data processing pipeline. Such a user interface preferably enables a user to select a storage destination for video data, which corresponds to a selection of either or both of the first and third modes of operation. That is the user can be presented with an interface (e.g., on display or touch screen 15) that allows them to pick local storage or remote storage of data. The option to choose remote storage, may only be enabled of the camera detects (or is told of) the connection of a secondary memory.

The camera 10 may include a power supply 112 system (shown in FIG. 3) for providing power for its operation. The power supply system 112 preferably includes at least one battery or other power storage system, or a port for receiving a power cable to receive power from an external power supply. The camera and/or power supply system 112 can include a power connection 114A or 114B respectively) for powering the secondary memory 100. The mass storage device may include a power supply system for providing power for its operation. The power supply system can include at least one battery or other power storage system or a port for receiving a power cable to receive power from an external power supply, such as the camera 10, the camera battery or another power source.

The camera 10 can include mounting structure 21A configured to cooperate with a corresponding mounting structure 21B on the mass storage device 100 (shown in FIG. 4 only for clarity) to mechanically couple the external memory 100 to the camera 10. For example, the mounting structures 21A and 21B can be mating components of a v-lock mount. The connections and/or ports of video interface can, in some embodiments, form part of the mechanical coupling.

The mass storage device can include further mounting structure(s) configured to cooperate with other components of a video camera system to mechanically couple the other components to the mass storage device when in use. In a preferred form, the other component is a battery that can be piggybacked on the mass storage device by a further mounting structure. In this embodiment, the mass storage system can further provide power from the battery to the camera. The mounting structure can be a battery plate mounted to the mass storage device. The mass storage device can include a power pass-through cable so that power can be provided from a battery to the camera. As noted above, embodiments of the present disclosure could be relatively easily implemented by updating the operational software of an existing camera which has a suitable data processing system and a video transmission interface, to enable such cameras to utilize a secondary memory as described herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital video camera including:
an image capture system configured to convert received light into video data;
a data processing pipeline configured to process at least said video data to generate video output data;
a video transmission system operable to transmit video output data in one or more native video data formats compatible with a native video transmission format of the video transmission system; and
a data storage system configured to receive video output data and store it in local non-volatile storage;
said data processing pipeline being operable in a plurality of modes including:
a first mode in which said video output data is passed to the data storage system for storage on local non-volatile storage;
a second mode in which said video output data is formatted into a native video data format of the video transmission system and passed to the video transmission system for transmission; and
a third mode in which said video output data is passed to the video transmission system for transmission to a secondary memory,
wherein when said third mode is used, said video transmission system is configured to transmit the video output data in a format-agnostic manner, and
wherein the data processing pipeline is further configured to generate second video data for transmission via the native video transmission format of the video transmission system without transcoding the second video data into video data having either of a video frame rate or resolution that is compatible with the native video data format.

2. A digital video camera as claimed in claim 1 wherein transmitting video output data in a format-agnostic manner includes transmitting the video output data without using either or both of the native video data formats or native video transmission format of the video transmission system.

3. A digital video camera as claimed in claim 1 wherein the video transmission system only applies data encoding of the video output data prior to transmission.

4. A digital video camera as claimed in claim 1 wherein the data processing pipeline is operable in the first mode simultaneously with either of the second or third modes.

5. A digital video camera as claimed in claim 1 wherein the data processing pipeline includes one or more of:
an image processing subsystem;
a video encoding subsystem; and
a format conversion subsystem;
wherein, when the data processing pipeline is operating in the third mode, video data is processed by the image processing system and video encoding system prior to being passed to the video transmission system.

6. A digital video camera as claimed in claim 1 wherein the camera includes a memory control subsystem configured to control storage of video data on the secondary memory by transmitting and/or receiving control signals to and/or from the secondary memory via the video transmission system to control storage and retrieval of video data on the secondary memory.

7. A digital video camera as claimed in claim 1 wherein the video transmission system includes at least a video output port.

8. A method of operating a video camera, including an image capture system configured to convert received light into video data; a data processing pipeline configured to process at least said video data to generate video output data; a video transmission system operable to transmit processed video data in at least one native video transmission format; and a data storage system configured to receive video output data and store it in local non-volatile storage; said data processing pipeline being operable in one or more of:
a first mode in which said video output data is passed to the data storage system for storage on local non-volatile storage;
a second mode in which said video output data is formatted into a native video data format of the video transmission system and passed to the video transmission system for transmission; and
a third mode in which said video output data is processed into a video data format that is not a native video data format of the video transmission system and passed to the video transmission system for transmission to a secondary memory,
the method including:
enabling the third mode of operation in the event that a secondary memory is connected to the video transmission system,
wherein when the data processing pipeline is operating in the third mode and a secondary memory is connected to the video transmission system, the method includes:
formatting the video output data into a form that is transmissible within the native video transmission format of the video transmission system by a applying data encoding of the video output data according to the native video transmission format of the video transmission system and transmitting the video data to the secondary memory.

9. The method of claim 8 wherein the native video transmission format is compatible with the transmission of video in a video data format data having one or more predetermined video frame rates and/or resolutions.

10. The method of claim 8 wherein, in the first and/or third modes of operation, the data processing pipeline processes video data into a storage format that is directly writable to a data storage medium.

11. The method of claim 8 wherein the method further includes receiving the video output data in the native video transmission format of the video transmission system; and processing the received data formatted according to the native video transmission format and converting the received data for writing to the data storage system.

12. The method of claim 8 wherein the method further includes transmitting and/or receiving storage system control data between the secondary storage system and the camera via the video transmission system.

13. A mass storage device for use with a video camera, said mass storage device including:
- a video data transfer interface including a video input port and/or video output port that are configured to be coupled to a video input source to receive data transmitted according to at least one native video transmission protocol;
- a data storage system configured to store data according to a data storage format; and
- a data conversion system configured to receive a signal representing video data to be written to the data storage system physically encoded according to a native video transmission protocol of the interface, but which is not in formatted according to either or both of the native video data formats or native video transmission format of the video data transfer interface,
- wherein the data conversion system is also configured to receive storage system control signals within the received data, and output control signals to the data storage system.

14. A mass storage device as claimed in claim 13 wherein data output from the data conversion system is directly available in a data storage format or converted thereto by removal of additional flow control data.

15. A mass storage device as claimed in claim 13 which further includes a mounting structure configured to cooperate with the video camera to mechanically couple the mass storage device to the video camera when in use.

16. A mass storage device for use with a video camera, said mass storage device including:
- a video data transfer interface including a video input port and/or video output port that are configured to be coupled to a video input source to receive data transmitted according to at least one native video transmission protocol,
- a data storage system configured to store data according to a data storage format; and
- a data conversion system configured to receive a signal representing video data to be written to the data storage system physically encoded according to a native video transmission protocol of the interface, but which is not in formatted according to either or both of the native video data formats or native video transmission format of the video data transfer interface,
- wherein the video data transfer interface is further configured to transmit data formatted according to at least one native video transmission protocol.

17. A mass storage device as claimed in claim 16 wherein data output from the data conversion system is directly available in a data storage format or converted thereto by removal of additional flow control data.

18. A mass storage device as claimed in claim 16 which further includes a mounting structure configured to cooperate with the video camera to mechanically couple the mass storage device to the video camera when in use.

19. A mass storage device for use with a video camera, said mass storage device including:
- a video data transfer interface including a video input port and/or video output port that are configured to be coupled to a video input source to receive data transmitted according to at least one native video transmission protocol;
- a data storage system configured to store data according to a data storage format; and
- a data conversion system configured to receive a signal representing video data to be written to the data storage system physically encoded according to a native video transmission protocol of the interface, but which is not in formatted according to either or both of the native video data formats or native video transmission format of the video data transfer interface,
- wherein the data conversion system is also configured to transmit storage system control signals over the video data transfer interface.

20. A mass storage device as claimed in claim 19 wherein data output from the data conversion system is directly available in a data storage format or converted thereto by removal of additional flow control data.

21. A mass storage device as claimed in claim 19 which further includes a mounting structure configured to cooperate with the video camera to mechanically couple the mass storage device to the video camera when in use.

* * * * *